Oct. 22, 1957
R. TARLETON
2,810,589
TONGUE FOR BOAT TRAILERS
Filed July 27, 1955
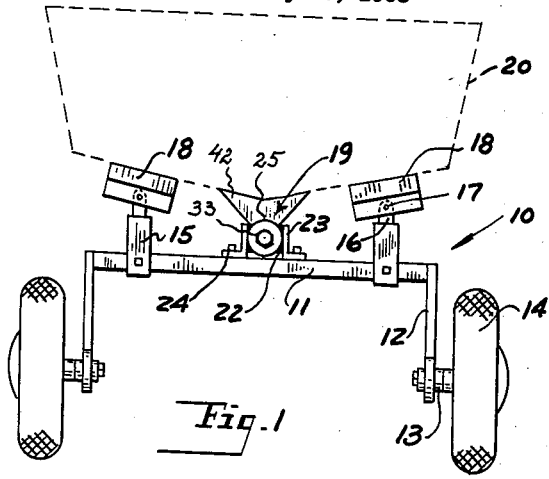
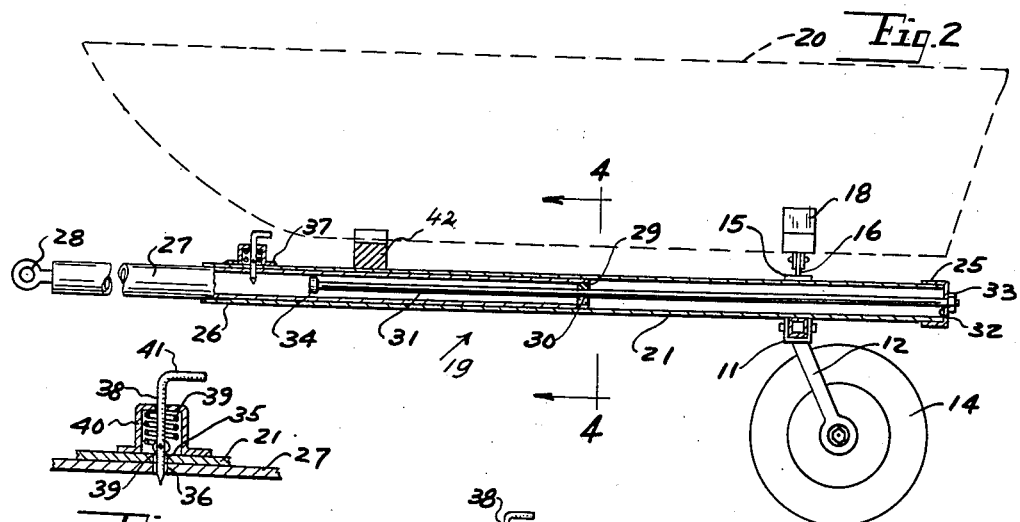
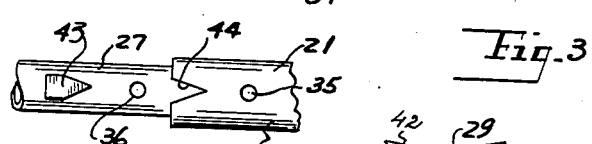
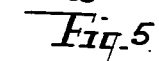
INVENTOR.
ROBERT TARLETON
BY
*Louis Chayka*
ATTORNEY United States Patent Office 2,810,589
Patented Oct. 22, 1957

2,810,589

TONGUE FOR BOAT TRAILERS

Robert Tarleton, Melvindale, Mich.

Application July 27, 1955, Serial No. 524,753

2 Claims. (Cl. 280—414)

The improvement pertains, generally, to a tongue for a trailer which includes a framework, a cradle for a boat, and two ground wheels upon which the framework is mounted. The tongue is a part of the framework and is provided with means for attachment, at its forward end, to the rear of an auto vehicle, such as a passenger automobile or a truck.

The object of the improvement is to provide a tongue which will form a fixed, tubular member of the framework, and which will contain a tubular member in a sliding relation to said fixed member and a rod in an axial position within the tongue, the rod serving to limit the longitudinal extension of said tubular members.

I shall now describe my improvement with reference to the accompanying drawings in which:

Fig. 1 is a rear end view of a trailer equipped with a tongue of my invention;

Fig. 2 is a side elevational view of the trailer, the view including the tongue which is shown partly in section;

Fig. 3 is an enlarged sectional view of a portion of a modified tongue;

Fig. 4 is a sectional view on line 4—4 of Fig. 3;

Fig. 5 is an enlarged top elevational view of a portion of a modified tongue;

Fig. 6 is a longitudinal sectional view of the respective end portions of two component members of the tongue in their fully-extended positions.

Similar numerals refer to similar parts throughout the several views.

For the purpose of identifying the relative position of the tongue to the other parts of the trailer, I will refer to Fig. 1 in which the framework of the trailer, generally marked 10, includes a horizontal rail 11. Extending downwardly from each end of the rail is a bar 12 which, at its lower end, is provided with a suitable bearing 13. Disposed within the bearing is a stub axle, not shown, of a ground wheel 14.

Clamped to the horizontal rail 11 are two upright standards 15, each including an upwardly-extending flat member 16. Hinged to each of said members, as shown at 17, is a pad 18 for support of the rear end of the boat 20 which is to be carried upon the trailer.

While the pads support one end portion of the boat, means are also provided to support the opposite end portion thereof. No detailed description is furnished in this respect, as the concept is well known and now universally in use.

The tongue, to which I shall now refer and which is generally marked 19, includes a tubular member 21 which is disposed crosswise to said rail 11 on top thereof. It is, preferably, welded to said rail between two brackets 23, as shown at 22, each of the brackets being secured to the rail by bolt means 24. The tubular member 21 is located midway the ends of the said rail and extends rearwardly thereof to a point approximately beyond the wheels 14. This end of the member, being the outer end thereof, is closed by a cap 25 to which I shall refer again.

The opposite end 26 of said member 21 is open, the whole length of said member being approximately equal to that of the boat which is to be carried on said trailer. Mounted on said member 21, close to its end 26, is a V-shaped prop 42 for support of the front end of the boat. Slidingly fitted into said member 21, which will be called the outer member, is an inner tubular member 27 which, at one end, called the outer end, is equipped with an eyelet 28, while the inner end of said member 27 is closed by a plug 29 which has an axial opening 30.

Slidingly fitting into said opening is a rod 31 which is, preferably, shorter than said outer tubular member 21 and which, at one end, passes through an axial opening 32 within the cap 25 and is secured to the cap by an externally-positioned nut 33. The opposite end of the rod is disposed within the inner tubular member 27 and terminates with a radially-expanded bulb or stopper 34.

The wall of the outer tubular member 21, at its end remote from the cap, is provided with a hole 35. A similar hole 36, located in the wall of the inner tubular member, is normally in register with the first-named hole. The holes serve for reception of a removable pin 38 which serves to keep the outer tubular member upon said inner tubular member, as shown in Fig. 2, and prevents any relative longitudinal movement therebetween.

An enlarged detail view of the pin and its mounting is shown in Fig. 6. It will be noted that the pin is connected to one end of a coil spring 39 which is confined within a yoke 40 mounted upon the outer surface of said member 21. The spring keeps the pin in its normal position, in which it extends downwardly through the holes 35 and 36. A right-angle crank 41 serves as a handle of the pin whereby the pin may be drawn up out of hole 36 against the tension of said spring.

The drawing in Fig. 5 shows a wedge 43 mounted on member 27 close to the hole 36, the wedge being adapted to enter a V-shaped notch 44 adjoining said hole 35 in the end portion 26 of the outer member 21 in order that the holes may be properly alined for entry of the pin 38.

I shall now describe the operation of the improved tongue:

Normally, the whole length of the inner tube 27, with the exception of the front portion terminating with the eyelet 28, is concealed within the outer tubular member 21 so that the two members are in a telescoped, longitudinal relation and are kept in said relation by means of said pin 38, as shown in Fig. 2.

It is while the above members are in the above-described relative positions to each other that the tongue, generally marked 19, is used during the transportation of a boat upon a trailer. For the unloading of the boat, the trailer is ordinarily backed into water from a sloping beach so that the trailer will be in a downwardly-slanting position. Should now the pin 38 be lifted out of hole 36 in the inner tubular member 27, the trailer will roll downwardly by gravity, or may be manually pulled, causing the outer tubular member 21 to slide along the inner tubular member till the stopper 34 on rod 31 will hit the plug 29, preventing further longitudinal movement of the outer tube. The resulting extension of the tongue ought to be, normally, sufficient to allow the trailer to roll far enough into water to float the boat or to make the unloading of it an easy matter.

When the outer tubular member 21 shall have been fully withdrawn to the extent allowed by said rod 31, the pin 38 will be thrust downwardly by spring 39 into the interior of said member 21, as shown in Fig. 3, into a position adjoining the inner end of the inner tubular member 27, crosswise to its wall, so as to prevent a sliding movement of the outer member 21 back along said inner member 27. This is important in instances when the boat is partly afloat and when, in response to the waves in the water, it is likely to push the trailer outwardly in the direction of the beach.

To return the trailer to its initial position with respect to the inner tubular member 27, while the latter is still attached to a vehicle, pin 38 has to be lifted out of the position shown in Fig. 6, permitting the trailer to be pushed towards the vehicle and the member 21 to slide along said member 27 till said pin 38 will encounter hole 36 in said member 27 and will be plunged into it by said spring 39. This will shorten the tongue to its original position for support of the boat for its transportation.

While the tongue has been described in its application to a boat trailer, it will be understood that the tongue may equally well be applied to other vehicular objects and to other analogous purposes.

What I, therefore, wish to claim is as follows:

1. In a boat trailer including a frame and wheels to support it, a tongue composed of an outer tubular member forming a fixed part of the frame, an inner tubular member telescopically fitting into the first-named tubular member, one end thereof, within the outer tubular member, being provided with a plug having an axial opening therein, the opposite end of said inner tubular member being adapted to be connected to a vehicle adapted to pull said trailer, and a rod at one end affixed axially to one end of the outer tubular member, at the rear of the trailer, the rod extending through the axial aperture in the plug into the inner tubular member and terminating therein with a radially-expanded stopper, the outer tubular member having a hole in its wall and the inner tubular member having a similar hole in its wall for register with the first-named hole, and pin means for insertion into the two holes to lock the members in place, the inner tubular member being adapted, upon withdrawal of the pin, to be drawn outwardly from the outer tubular member till said stopper has come in contact with said plug and past said pin which, on insertion through the wall of the outer tubular member, will prevent telescoping of the two tubular members.

2. In a trailer for transportation of a boat, the trailer including a crossbeam and a pair of wheels for support thereof, a tongue disposed crosswise to the beam, the tongue including a tubular outer member affixed to said beam midway its length, the member having a length approximating that of the boat to be carried on said trailer, a cap closing one end of the outer tubular member at the rear portion of the trailer, the other end of the member being open, an inner tubular member in a telescopic relation with said outer tubular member, said inner tubular member having one end within the outer tubular member closed by a plug with an axial opening therein, the opposite end of the inner tubular member being adapted to be attached to another vehicle, a rod at one end secured to said cap, the rod slidingly passing through the axial aperture in the plug into the inner tubular member and terminating therein with a radially-expanded stopper, each of the tubular members being provided with a hole in its wall, at the end remote from said cap, the holes being adapted to be in register when the inner tubular tube is disposed to its full operative extent within the outer tubular member, and a spring-biased pin associated with the outer surface of the outer tubular member, the pin being adapted to enter both holes when they are in register to prevent withdrawal of the inner tubular member from said outer tubular member, the inner tubular member being adapted to be drawn outwardly from the outer tubular member to a distance permitted by the stopper on said rod but past the location of the pin when said pin may be thrust radially into the interior of the outer tube to the rear of the plug in the inner tubular member to prevent telescoping of the two tubular members.

References Cited in the file of this patent

UNITED STATES PATENTS

| | | |
|---|---|---|
| 2,417,646 | Hallner | Mar. 18, 1947 |
| 2,446,223 | Forney | Aug. 3, 1948 |
| 2,636,745 | Cartwright | Apr. 28, 1953 |
| 2,708,045 | Shontz | May 10, 1955 |
| 2,710,569 | Altgelt | June 14, 1955 |